United States Patent [19]
Lang et al.

[11] Patent Number: 5,560,643
[45] Date of Patent: Oct. 1, 1996

[54] AIRBAG MODULE WITH CLAMPED ATTACHMENT OF AIRBAG CUSHION

[75] Inventors: Gregory J. Lang; Harry W. Miller, II, both of Ogden, Utah

[73] Assignee: Morton International, Inc., Chicago, Ill.

[21] Appl. No.: 449,310

[22] Filed: May 24, 1995

[51] Int. Cl.$^6$ ................................................ B60R 21/16
[52] U.S. Cl. ........................................ 280/728.2; 280/731
[58] Field of Search ................................. 280/728.2, 741, 280/731, 732, 728.1

[56] References Cited

U.S. PATENT DOCUMENTS

| | | | |
|---|---|---|---|
| 4,913,461 | 4/1990 | Cuevas | 280/731 |
| 5,141,247 | 8/1992 | Barth | 280/728.2 |
| 5,176,400 | 1/1993 | McGuire et al. | 280/728 |
| 5,186,492 | 2/1993 | Wright et al. | 280/731 |
| 5,193,846 | 3/1993 | Allard | 280/728 |
| 5,195,774 | 3/1993 | Morita | 280/731 |
| 5,320,379 | 6/1994 | Burnard et al. | 280/731 |

FOREIGN PATENT DOCUMENTS

| | | | |
|---|---|---|---|
| 2-133266 | 5/1990 | Japan | 280/728.2 |

Primary Examiner—Paul N. Dickson
Attorney, Agent, or Firm—George W. Rauchfuss, Jr.; Gerald K. White

[57] ABSTRACT

An airbag module incorporates an inflatable airbag cushion having an inflatable body and a collar defining an open mouth for receiving inflation gas, with a stiffening collar ring secured to the collar. The airbag module also includes an inflator and a module housing, the inflator having a peripheral bracket extending radially outwardly and the module housing having an opening. The collar of the airbag cushion extends through the opening and the inflator fits within the open mouth of the airbag cushion with the collar ring and collar seated between the module housing and the peripheral bracket. Clamping structure secures the airbag cushion to the airbag module. The clamping structure is an inwardly facing c-shaped ring having a top leg secured to or integral with the module housing and a bottom leg, with the peripheral bracket, the collar ring and the collar clamped between the legs. In another embodiment, the airbag module includes a c-shaped ring clamping the collar ring and the collar to the peripheral bracket. In a further embodiment, the peripheral bracket of the inflator includes a distal end curled over to clamp the collar ring and the collar to the peripheral bracket.

28 Claims, 3 Drawing Sheets

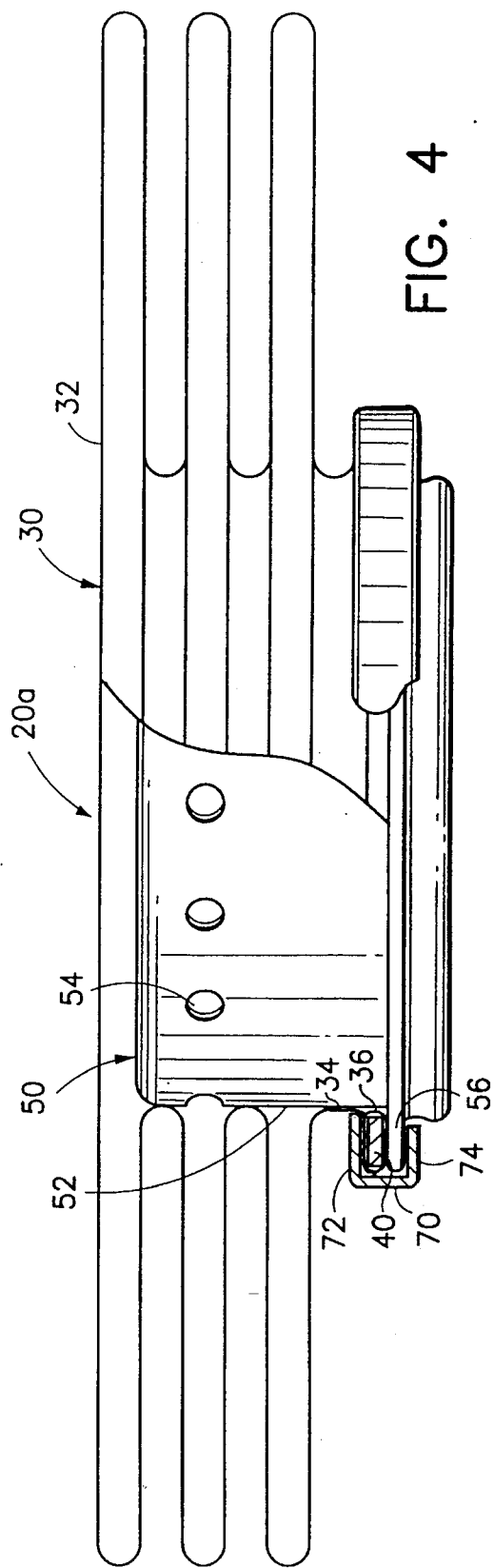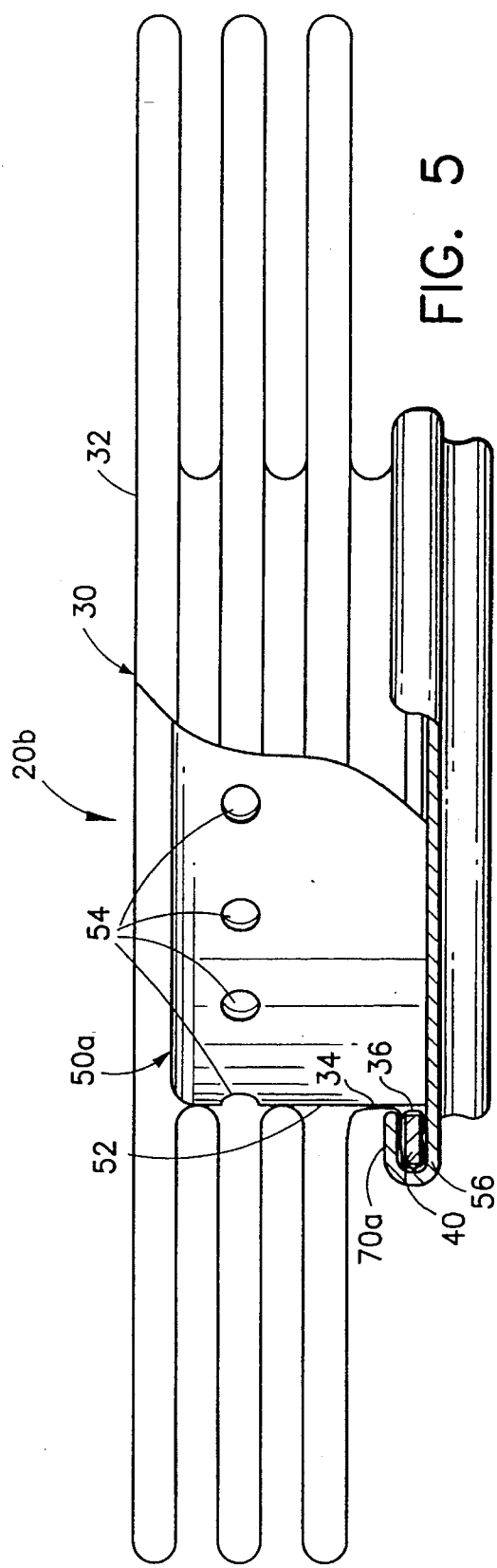

AIRBAG MODULE WITH CLAMPED ATTACHMENT OF AIRBAG CUSHION

FIELD OF THE INVENTION

The present invention relates to an airbag module with clamped attachment of an airbag cushion and, more particularly, to an airbag cushion incorporating a stiffening collar ring attached to the airbag cushion, both being clamped to the airbag module.

BACKGROUND OF THE INVENTION

Simplifying airbag modules is helpful in reducing the complexity and costs of inflatable restraint systems which have previously been used for protecting an occupant of a vehicle against injury by physically restraining the occupant's body when the vehicle encounters a collision. Inflatable restraint systems for use in automobiles have generally consisted of an airbag module including an inflator for providing gas to inflate an inflatable airbag cushion, and a remote deceleration sensor for initiating operation of the inflator.

The airbag module has a number of separate components which must be assembled together during manufacturing, including a module housing, an inflator, and an airbag cushion incorporating an airbag retainer ring. The inflator provides the gas for inflating the airbag. These separate components, which are usually fastened together using nuts and bolts or other, similar, fastening means, are used in the systems shown and described in U.S. Pat. No. 5,193,846, as an example.

Eliminating one or more of the components that must be assembled together would go far in reducing manufacturing time, and the complexity and cost of an airbag module. Specifically, eliminating the need to fasten together the separate components of the airbag module with nuts and bolts and eliminating the airbag retaining ring would reduce the necessary inventory of manufacturing components and the number of steps required to assembly the airbag module.

SUMMARY OF THE INVENTION

A principal object, therefore, of the present invention is to reduce the manufacturing time, complexity and cost of an airbag module.

Another object of the present invention is to reduce the number of steps required to assemble an airbag module.

An additional object of the present invention is to simplify the construction of an airbag module and reduce the number of parts and components comprising an airbag module.

A further object of the present invention is to eliminate the need for an airbag retaining ring and fasteners within an airbag module.

In carrying out this invention, there is provided an airbag module incorporating an airbag cushion with a stiffening collar ring. The airbag cushion has an inflatable body and a collar defining an open mouth for receiving inflation gas, with the collar ring secured to the collar of the airbag cushion. Clamping means is provided to clamp the collar ring and the collar of the airbag cushion to the airbag module, with the collar ring providing an anchor for the airbag cushion.

The airbag module of the present invention further includes an inflator having a generally cylindrical sidewall defining a plurality of gas exhaust openings, and a peripheral bracket extending radially outwardly from the cylindrical sidewall below the gas exhaust openings. The inflator fits within the open mouth of the airbag cushion, so that the plurality of exhaust openings are located within the airbag cushion with the collar ring seated on the peripheral bracket. The clamping means clamps the collar ring to the peripheral bracket, whereby the inflator and the airbag cushion are secured together.

According to one aspect of the present invention, the peripheral bracket includes a distal end which comprises the clamping means, curling over the collar ring to clamp the collar ring to the peripheral bracket.

According to another aspect of the present invention, the clamping means comprises an inwardly facing c-shaped ring having a top leg and a bottom leg, with the peripheral bracket and the collar ring clamped therebetween.

According to yet another aspect of the present invention, the airbag module further includes a module housing for mounting the airbag cushion and inflator. The module housing includes an airbag cushion mounting opening having a smaller diameter than that of the collar ring. The collar of the airbag cushion extends through the opening and the inflator fits within the open mouth of the airbag cushion with the collar ring and collar seated between the module housing and the peripheral bracket, so that the collar ring cannot be pulled through the opening. Clamping means securing the airbag cushion to the airbag module comprises an inwardly facing c-shaped ring having a top leg and a bottom leg, with the peripheral bracket, the collar ring and the collar clamped therebetween and with the top leg secured to or integral with the module housing.

Because the airbag module does not require an airbag cushion retaining ring, or nuts and bolts or other similar fastening means as have been used on previous airbag modules to secure the airbag cushion to the other components of the airbag module, the airbag module with clamped attachment of the airbag cushion requires a smaller number of parts and can be assembled in fewer steps. The present invention therefore reduces the manufacturing time, complexity and cost of the airbag module.

Additionally, the present invention provides a strong bag attachment. Previous airbag modules require that fastener openings or holes be made in the collar of the airbag cushion to accommodate the bolts or other fastening means that must pass through the airbag cushion, the airbag cushion retaining ring, the module housing and the inflator peripheral bracket to secure these components together. However, these openings or holes may make the surrounding portions of the airbag cushion susceptible to tearing, and therefore require that airbags be made stronger. The present invention provides a strong airbag attachment by securing the airbag cushion without making openings or holes in the airbag cushion, or otherwise compromising the integrity of the airbag cushion.

The invention together with further objects, features, advantages and aspects thereof, will be more clearly understood from the following description taken in connection with the accompanying drawings.

BRIEF DESCRIPTION OF THE DRAWINGS

FIG. 4 is a side elevation view, partially in section, of another airbag module of the present invention; and FIG. 5 is a side elevation view, partially in section, of another airbag module of the present invention.

The same reference numerals refer to the same elements throughout the various figures.

DETAILED DESCRIPTION OF THE INVENTION

The present invention is directed to a airbag module with clamped attachment of an airbag cushion, for use as part of an inflatable restraint system. The airbag module incorporates an airbag cushion having an inflatable body and a collar defining an open mouth for receiving inflation gas, with a stiffening collar ring secured to the collar. An inflator, module housing and clamping means are also incorporated as part of the airbag module.

Other parts of an inflatable restraint system including the particular contents of an inflator for generating gas necessary for inflating an airbag, the sensor means for initiating the inflator and the method and hardware for mounting an airbag module in an automobile are all known in the art and, accordingly, are not described in detail as they do not in themselves constitute features of the present system. Only the components of an airbag module according to the present invention, including exterior portions of an inflator, a module housing and airbag cushion as they relate to the instant invention will be described in detail.

Figure 1:
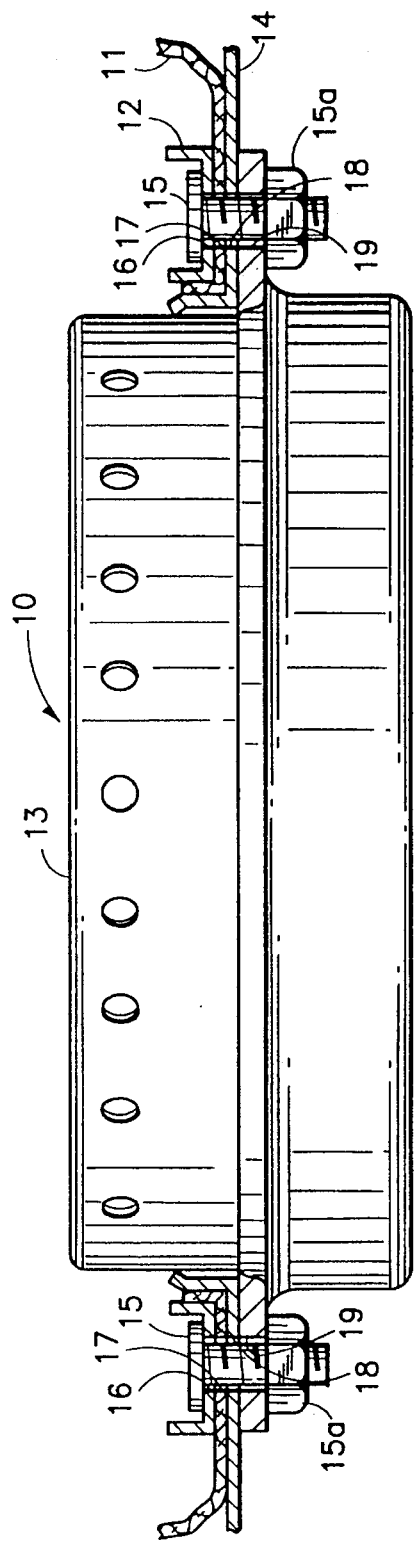
FIG. 1 is a side elevation view, partially in section, of a prior art airbag module.

Referring first to FIG. 1, a prior art airbag module is generally represented by the reference numeral 10 and includes an inflatable airbag cushion 11, an airbag cushion retaining ring 12, an inflator 13, and a module housing 14. Fasteners 15 pass through retaining ring fastener holes 16, airbag cushion fastener holes 17, module housing fastener holes 18 and inflator fastener holes 19 terminating with nuts 15a or the like. The airbag cushion 11 is secured to the airbag module 10 by the airbag retaining ring 12 which is also secured to the airbag module 10 by the fasteners 15 and nuts 15a positioned at spaced apart intervals on the ring 12. Installation of these fasteners 15 adds greatly to the time and complexity of assembling the airbag module 10.

Figure 2:
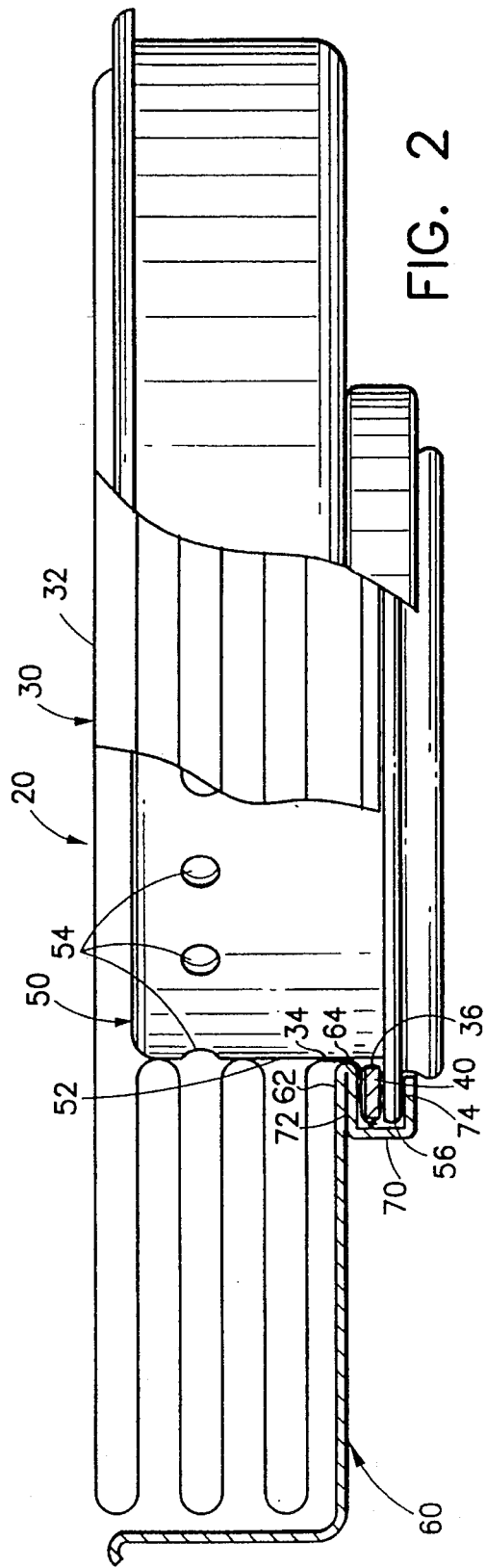
FIG. 2 is a side elevation view, partially in section, of an airbag module of the present invention.
Figure 3:
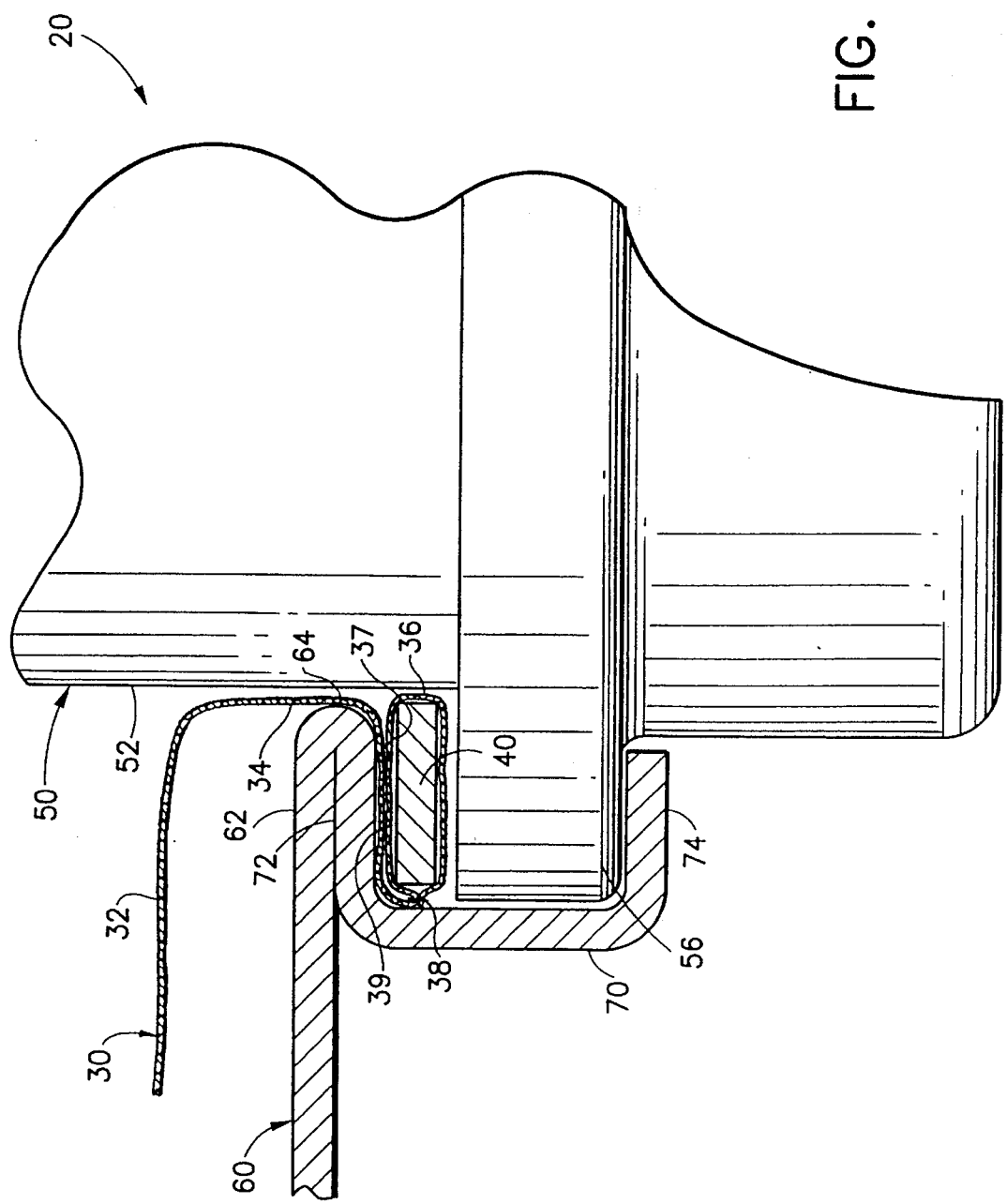
FIG. 3 is an enlargement of a portion of the airbag module shown in FIG. 2.

The present invention provides an airbag module that does not require the use of the plurality of individual fasteners 15, or the airbag cushion retaining ring 12 of FIG. 1. Referring to FIGS. 2 and 3, an airbag module according to the present invention is generally represented by the reference numeral 20 and incorporates an airbag cushion 30 having a stiffening collar ring 40. The airbag module 20 also includes an inflator, generally represented by the reference numeral 50, and a module housing, generally represented by the reference numeral 60.

The inflatable airbag cushion 30 has an inflatable body 32 and a collar 34 defining an open mouth 36 for receiving inflation gas. The stiffening collar ring 40 is secured to the collar 34 of the airbag cushion 30 and, in the embodiment shown, the collar ring 40 is positioned in a pocket 37 formed by folding back the collar 34 and stitching the collar to itself at 38.

The module housing 60 has an inner marginal edge 62 defining an airbag cushion mounting opening 64 through which the collar 34 of the airbag cushion 30 extends with the collar ring 40 received below the marginal edge 62. The diameter of the collar ring 40 is greater than the diameter of the opening 64 so that the collar ring 40 and the collar 34 secured thereto cannot be pulled through the opening 64 during inflation of the airbag cushion 30.

The inflator 50 has a generally cylindrical sidewall 52 defining a plurality of gas exhaust openings 54, and a peripheral bracket 56 extending radially outward from the cylindrical sidewall 52 below the gas exhaust openings 54. The portion of the inflator 50 above the bracket 56 protrudes through the airbag cushion mounting opening 64 in the module housing 60 and fits within the open mouth 36 of the airbag cushion 30, so that the plurality of exhaust holes 54 are located above the airbag cushion mounting opening 64 and within the airbag cushion 30. The peripheral bracket 56 is superimposed with the collar ring 40.

The airbag module 20 further includes a clamping means 70 secured to the module housing 60 adjacent to and surrounding the inner marginal edge 62 and extending downwardly therefrom. The clamping means clamps the peripheral bracket 56 of the inflator 50, the collar ring 40, and the collar 34 of the airbag cushion 30 so that the module housing 60, the inflator 50 and the airbag cushion 30 are secured together.

As shown, the clamping means comprises an inwardly facing c-shaped ring 70 having a top leg 72 extending from the inner marginal edge 62 of the module housing 60 so that the module housing 60 and the c-shaped ring 70 form an integral unit. The c-shaped ring 70 has a bottom leg 74, with the peripheral bracket 56, collar ring 40, and collar 34 clamped between the top leg 72 and the bottom leg 74.

During manufacturing the housing is fabricated with the lower leg 74 extending downwardly, and the airbag cushion 30, collar ring 40 and inflator 50 are positioned in the opening 64. Then the lower leg 74 is crimped inwardly, under the peripheral bracket 56 to clamp the peripheral bracket 56, collar 34 and collar ring 40 together, and assemble the airbag module 20 as a unit.

The airbag module 20 is incorporated as part of an inflatable restraint system, which is mounted to a vehicle, with the airbag cushion 30 folded to closely surround the inflator 50 prior to operation. Upon operation of the inflator 50, the clamped collar 34 and collar ring 40 hold the airbag cushion 30 securely to the inflator 50 and module housing 60 as the airbag cushion 40 fills with inflation gas.

Due to the extreme temperatures and pressures associated with operation of the inflator 50, the sidewall 52 of the inflator 50 adjacent the collar ring 40 and collar 34 becomes hot and may deform. Referring to FIG. 3, a portion 39 of the collar 34 of the airbag cushion 30 secured to the collar ring 40 folds back upon itself, adjacent the collar ring 40 and is clamped to the peripheral bracket 56 together with the collar ring 40. It has been found that folding the collar 34 in this manner strengthens the attachment between the collar ring 40 and the collar 34 and relieves strain on the stitching 38. In addition, the collar ring 40 and collar 34 fit more securely within the clamping means and will be less likely to become unattached even if the sidewall 52 of the inflator 50 adjacent the collar ring 40 and collar 34 does deform. The portion 39 of the collar 34 may be folded either above or below the collar ring 40.

With reference to FIG. 4, there is shown another airbag module 20a according to the invention herein. The airbag module 20a incorporates the inflator 50, the airbag cushion 30 with stiffening collar ring 40 and clamping means 70 without the module housing 60 of the airbag module 20 of FIGS. 2 and 3. The inflator 50 fits within the open mouth 36 of the airbag cushion 30, so that the plurality of exhaust openings 54 are located within the airbag cushion 30 and with the collar ring 40 and collar 34 seated on the peripheral bracket 56. The clamping means 70 comprises the inwardly facing c-shaped ring 70, with the peripheral bracket 56, the collar 34 and the collar ring 40 clamped between the top leg 72 and the bottom leg 74. Thus, the airbag cushion 30 is secured to the inflator 50 with the gas outlet openings 54 within the inflatable body 32 of the airbag cushion 30. The airbag module 20a may be secured in a module housing by other means, such as by threaded studs extending from underside of inflator 50, or the like.

Referring to FIG. 5, there is shown an additional airbag module 20b of the present invention. The airbag module 20b incorporates the airbag cushion 30 with collar ring 40 and an inflator 50a without the module housing 60 or c-shaped ring 70 of the airbag modules 20,20a of FIGS. 2 through 4. The peripheral bracket 56 on the inflator 50a includes a distal end 70a which comprises the clamping means 70a, the distal end 70a curling over to clamp the collar ring 40 and collar 34 to the peripheral bracket 56. Thus, the airbag cushion 30 is secured to the inflator 50a with the gas outlet openings 54 within the inflatable body 32 of the airbag cushion 30.

Airbag modules according to the present invention may also include other changes and modifications without departing from the true spirit and scope of the present invention. For example, the stiffening collar ring 40 may be secured to the collar 34 of the airbag cushion 30 by gluing or another suitable attachment method. In addition, the clamping means may also comprise a plurality of inwardly facing c-shaped clamps extending from the inner marginal edge 62 of the module housing 60. The plurality of c-shaped clamps are similar to the c-shaped ring 70a, each having a top leg and a bottom leg, with the peripheral bracket 56, collar 34 of the airbag cushion 30 and the collar ring 40 clamped therebetween. The c-shaped ring 70a or other clamping means may be secured to or an integral part of the module housing 60.

As shown, the airbag modules 20, 20a, 20b of the present invention do not require an airbag cushion retaining ring secured by a plurality of fasteners and nuts passing through holes, like previous airbag modules as illustrated by the airbag module 10 of FIG. 1, for example, to secure the airbag cushion to the other components comprising the airbag module. Therefore, the airbag modules 20, 20a, 20b of the present invention require a smaller number of parts and can be assembled in fewer steps, thereby reducing the manufacturing time, complexity and cost of the airbag module.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflatable airbag cushion for use as part of an airbag module, the airbag module further including a clamping means and an inflator having a radially extending peripheral bracket with a flat annular portion, the inflatable airbag cushion comprising:
    an inflatable body and a collar devoid of fastener passageways and defining an open mouth for receiving inflation gas; and
    a flat annular, rigid stiffening collar ring having a flat surface devoid of fastener openings or holes and being secured by the collar of the airbag cushion, the collar ring and collar sized and adapted to be seated on the peripheral bracket of the inflator so that the flat surface of the flat annular, rigid stiffening collar ring would lie adjacent the flat portion of the peripheral bracket, whereby the clamping means could extend inwardly over the collar ring to clamp the peripheral bracket, the collar ring and the collar without passing therethrough for securing the airbag cushion to the airbag module.

2. The inflatable airbag cushion of claim 1, wherein the stiffening collar ring is secured to the collar of the airbag cushion by containment in a peripheral pocket formed in the collar.

3. The inflatable airbag cushion of claim 2, wherein the pocket containing the stiffening collar ring is formed by stitching.

4. An airbag module comprising:
    an airbag cushion having an inflatable body and a collar defining an open mouth for receiving inflation gas;
    a flat annular stiffening collar ring secured to the collar of the airbag cushion;
    an inflator having a generally cylindrical sidewall defining a plurality of gas exhaust openings and a peripheral bracket having a flat portion extending radially outwardly from the cylindrical sidewall below the gas exhaust openings, the inflator fitting within the open mouth of the airbag cushion so that the plurality of exhaust openings are located within the airbag cushion, with the collar ring and the collar seated on the peripheral bracket with a flat surface of the flat annular stiffening collar ring adjacent the flat portion of the peripheral bracket; and
    clamping means extending inwardly over the collar ring and clamping the collar ring and the collar to the peripheral bracket, whereby the airbag cushion is secured to the inflator.

5. The airbag module of claim 4, wherein a portion of the collar of the airbag cushion secured to the collar ring folds back upon itself adjacent the collar ring and is clamped to the peripheral bracket together with the collar ring.

6. The airbag module of claim 5, wherein the stiffening collar ring is secured to the collar of the airbag cushion by containment in a peripheral pocket formed in the collar.

7. The airbag module of claim 6, wherein the pocket containing the stiffening collar ring is formed by stitching.

8. The airbag module of claim 4, wherein the peripheral bracket on the inflator includes a distal end comprising the clamping means, curling over to clamp the collar ring and the collar to the peripheral bracket.

9. An airbag module comprising:
    an airbag cushion having an inflatable body and a collar defining an open mouth for receiving inflation gas;
    a stiffening collar ring secured to the collar of the airbag cushion;
    an inflator having a generally cylindrical sidewall defining a plurality of gas exhaust openings and a peripheral bracket extending radially outwardly from the cylindrical sidewall below the gas exhaust openings, the inflator fitting within the open mouth of the airbag cushion so that the plurality of exhaust openings are located within the airbag cushion, with the collar ring and the collar seated on the peripheral bracket; and
    an inwardly facing c-shaped ring having a top leg and a bottom leg, the peripheral bracket, the collar ring and the collar clamped therebetween.

10. The airbag module of claim 9, wherein a portion of the collar of the airbag cushion secured to the collar ring folds back upon itself, adjacent the collar ring and is clamped to the peripheral bracket together with the collar ring.

11. The airbag module of claim 10, wherein the stiffening collar ring is secured to the collar of the airbag cushion by containment in a peripheral pocket formed in the collar.

12. The airbag module of claim 11, wherein the pocket containing the stiffening collar ring is formed by stitching.

13. The airbag module of claim 9, and further comprising a module housing for mounting the airbag cushion and the inflator, wherein the clamping means is secured to the module housing.

14. The airbag module of claim 13, wherein the module housing defines an airbag cushion mounting opening receiving the airbag cushion with the cylindrical sidewall of the inflator contained within the airbag cushion, the collar of the airbag cushion extends through the airbag cushion mounting opening with the collar ring and the collar positioned between the module housing and the peripheral bracket, and the clamping means is positioned on the module housing surrounding the opening, the collar ring, the collar and the peripheral bracket.

15. The airbag module of claim 14, wherein the diameter of the stiffening collar ring is greater than the diameter of the airbag cushion mounting opening through which the collar extends, so that the collar ring and attached collar of the airbag cushion cannot be pulled through the opening in the module housing.

16. The airbag module of claim 15, wherein the clamping means comprises an inwardly facing c-shaped ring having a top leg and a bottom leg with the peripheral bracket, the collar ring and the collar clamped therebetween, and the top leg is secured to the module housing.

17. The airbag module of claim 16, wherein a portion of the collar of the airbag cushion secured to the collar ring folds back upon itself adjacent the collar ring and is clamped to the peripheral bracket together with the collar ring.

18. The airbag module of claim 17, wherein the stiffening collar ring is secured to the collar of the airbag cushion by containment in a peripheral pocket formed in the collar.

19. The airbag module of claim 14, wherein the clamping means is integrally formed as part of the module housing.

20. The airbag module of claim 19, wherein the diameter of the stiffening collar ring is greater than the diameter of the module housing opening through which the collar extends, so that the collar ring and attached collar of the airbag cushion cannot be pulled through the opening in the module housing.

21. An airbag module comprising:
a module housing having an inner marginal edge defining an airbag cushion mounting opening;
a clamping means secured to the module housing adjacent to and surrounding the inner marginal edge and extending downwardly;
an airbag cushion having an inflatable body and a collar defining an open mouth for receiving inflation gas;
a stiffening collar ring secured to the collar of the airbag cushion, the collar extending through the airbag cushion mounting opening of the module housing with the collar ring and the collar received below the marginal edge of the module housing defining the airbag cushion mounting opening and within the surrounding clamping means, the diameter of the stiffening collar ring being greater than the diameter of the airbag cushion mounting opening through which the collar extends, so that the collar ring and the secured collar of the airbag cushion cannot be pulled through the opening in the module housing; and
an inflator having a generally cylindrical sidewall defining a plurality of gas exhaust openings, and a peripheral bracket extending radially outwardly from the cylindrical sidewall below the gas exhaust openings, the inflator protruding through the airbag cushion mounting opening in the module housing and fitting within the open mouth of the airbag cushion so that the plurality of exhaust holes are located above the airbag cushion mounting opening and within the airbag cushion, the peripheral bracket being superimposed with the collar ring and collar within the downwardly extending clamping means surrounding the airbag cushion mounting opening, and the clamping means clamping the peripheral bracket of the inflator, the collar ring and the collar to the module housing.

22. The airbag module of claim 21, wherein a portion of the collar of the airbag cushion secured to the collar ring folds back upon itself, adjacent the collar ring and is clamped to the peripheral bracket together with the collar ring.

23. The airbag module of claim 22, wherein the stiffening collar ring is secured to the collar of the airbag cushion by containment in a peripheral pocket formed in the collar.

24. The airbag module of claim 23, wherein the pocket containing the stiffening collar ring is formed by stitching.

25. The airbag module of claim 24, wherein the clamping means comprises an inwardly facing c-shaped ring having a top leg and a bottom leg, the peripheral bracket, the collar ring and the collar clamped therebetween, the top leg secured to the module housing.

26. The airbag module of claim 25, wherein the top leg of the c-shaped ring extends from the inner marginal edge of the module housing so that the c-shaped ring is integrally formed from the module housing.

27. The airbag module of claim 21, wherein the clamping means comprises a plurality of inwardly facing c-shaped clamps positioned spaced-apart about the inner marginal edge of the module housing, each of the clamps having a top leg and a bottom leg with the peripheral bracket, the collar ring and the collar clamped therebetween and the top legs secured to the module housing.

28. The airbag module of claim 27, wherein the top legs of the plurality of c-shaped clamps extend from the inner marginal edge of the module housing so that the plurality of c-shaped clamps are integrally formed from the module housing.

* * * * *